United States Patent [19]

Leone et al.

[11] Patent Number: 4,914,549
[45] Date of Patent: Apr. 3, 1990

[54] CIRCUIT BREAKER MOVEMENT MECHANISM

[75] Inventors: David A. Leone, Lawrenceville, Ga.; James H. Leonard, Albemarle, N.C.

[73] Assignee: Siemens Energy & Automation, Inc., Atlanta, Ga.

[21] Appl. No.: 250,792

[22] Filed: Sep. 28, 1988

[51] Int. Cl.4 ............................................. H02B 9/00
[52] U.S. Cl. ............................ 361/336; 200/50 AA; 200/50 R; 361/337; 361/342; 361/343
[58] Field of Search ...................... 200/50 AA, 50 R; 361/335–339, 342, 343

[56] References Cited

U.S. PATENT DOCUMENTS

| | | | |
|---|---|---|---|
| 4,051,334 | 9/1977 | Ericson | 200/50 AA |
| 4,112,269 | 9/1978 | Nelson et al. | 200/50 AA |
| 4,317,160 | 2/1982 | Tillson et al. | 361/339 |
| 4,612,429 | 9/1986 | Milianowicz | 200/288 |
| 4,728,757 | 3/1988 | Buxton et al. | 200/50 AA |
| 4,761,521 | 8/1988 | Beck et al. | 200/50 AA |

Primary Examiner—Gregory D. Thompson
Attorney, Agent, or Firm—James G. Morrow

[57] ABSTRACT

A mechanism for moving and supporting a circuit breaker relative to a bus bar arrangement such that the circuit breaker can be engaged and disengaged from the bus bar arrangement. The mechanism functions to engage and disengage the circuit breaker while also preventing engagement and disengagement of the circuit breaker from the bus bar arrangement while the circuit breaker is not tripped. The mechanism can also function to indicate whether or not the circuit breaker is engaged or disengaged with the bus bar arrangement.

17 Claims, 4 Drawing Sheets

CIRCUIT BREAKER MOVEMENT MECHANISM

BACKGROUND OF INVENTION

This invention relates to a circuit breaker, and more particularly, to a mechanism for moving and supporting a circuit breaker relative to a bus bar arrangement.

In many applications, a circuit interrupting device is removably connected to the primary terminals of the bus bar arrangement of a power distribution system. For example, U.S. Pat. No. 4,612,429 illustrates circuit interrupter units which are movably mounted on wheels and retractable rails so that the units can be pulled out of a metal enclosure for servicing or inspection. The circuit interrupter units are electrically connected to three-phase terminals disposed to make electrical contact with primary terminals in the rear of the metal enclosure when the circuit interrupter units are pushed into the metal enclosure and firmly seated in their normal operating positions.

One problem with this type of arrangement is supplying the force necessary to firmly seat the circuit interrupter (three-phase) terminals with the primary terminals. Additionally, a source of removal force is required to overcome the friction between interrupter terminals and the primary terminals so that the circuit interrupting devices can be retracted from the metal enclosure. One way of supplying these forces has been to use a lead screw assembly which moves the circuit interrupter along the rails when the lead screw is rotated.

Another problem with this type of arrangement is the provision of a mechanism which prevents a circuit interrupter from being disengaged from the primary terminals while the circuit interrupter is closed (un-tripped status). Another related problem is insuring that the circuit interrupter is tripped before engaging the circuit interrupter with the primary terminal.

Accordingly, it would be advantageous to provide a mechanism which can supply the forces necessary to move a circuit beaker in and out of engagement with the primary terminals of a bus bar structure. It would also be advantageous to provide a mechanism which prevents the movement of the circuit breaker when its status is un-tripped.

SUMMARY OF THE INVENTION

The present invention provides a mechanism for moving and supporting a circuit breaker relative to a bus bar arrangement such that the circuit breaker can be engaged and disengaged from the bus bar arrangement. The mechanism includes a means for supporting the circuit breaker, means for moving the circuit breaker relative to the bus bar arrangement and means for restricting operation of the of the means for moving when the circuit breaker is not tripped.

An advantage of the present invention is that the circuit breaker can not be engaged or disengaged from the primary terminals while the circuit breaker is not tripped. Another advantage of the present invention is that the circuit breaker moving force is conveniently applied to the circuit breaker.

Various other advantages of the present invention will become apparent from the following description, with reference to the accompanying drawing.

DETAILED DESCRIPTION OF THE PREFERRED EMBODIMENT

Figure 1:
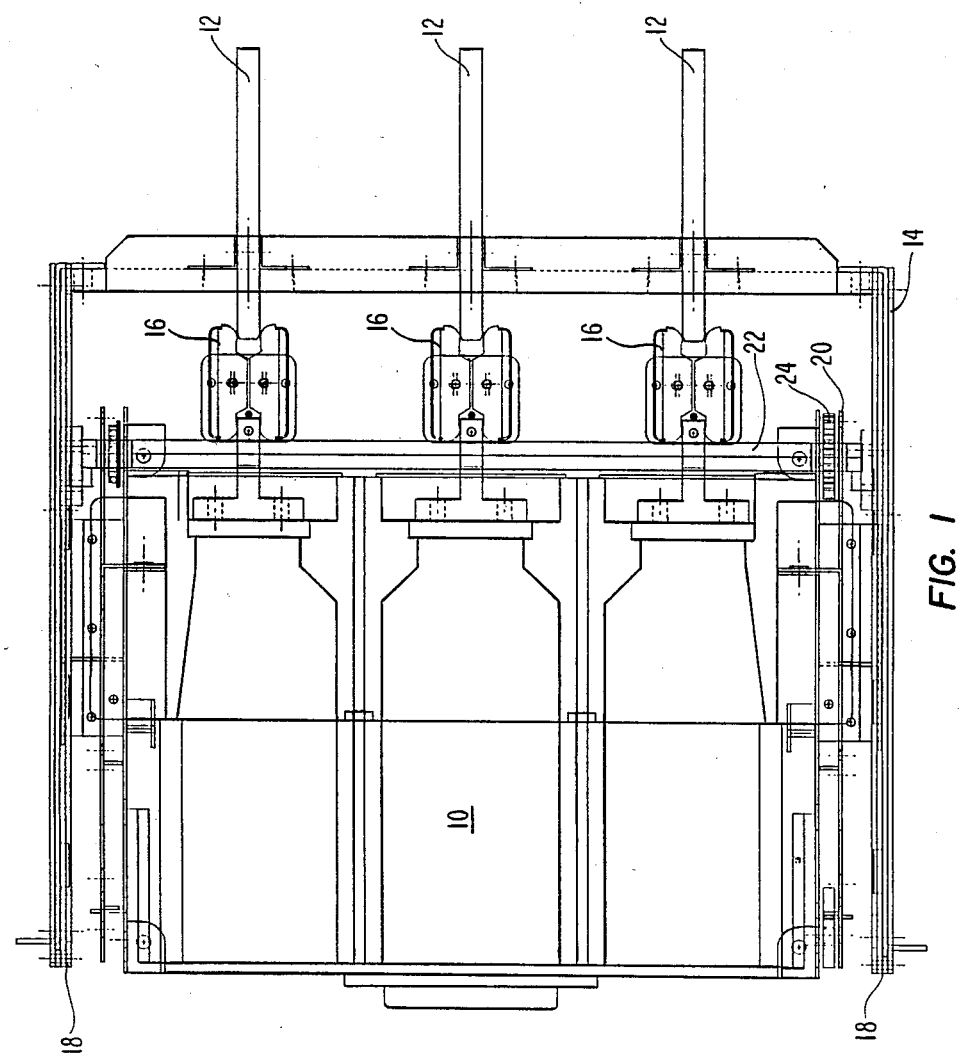
FIG. 1 is a top view of the circuit breaker movement mechanism supporting a circuit breaker.

Referring now to FIG. 1, FIG. 1 illustrates three phases of a circuit breaker 10 partially engaged to the primary terminals 12 of a bus bar assembly. The circuit breaker 10 is located within a housing 14 and is engaged to the primary terminals 12 of the three phases via engagement finger assemblies 16. A circuit breaker movement mechanism functions to move the circuit breaker 10 via the rails 18. The circuit breaker 10 and rails 18 are supported and guided by roller assemblies 21 and the rails 18 can include rollers 19 (FIG. 2) to reduce the force to move the circuit breaker 10 via the rails 18. The movement mechanism is designed so the friction between the terminals 12 and assemblies 16 can be overcome for purposes of engaging and disengaging the circuit breaker 10 from the bus bar assembly.

Figure 2:
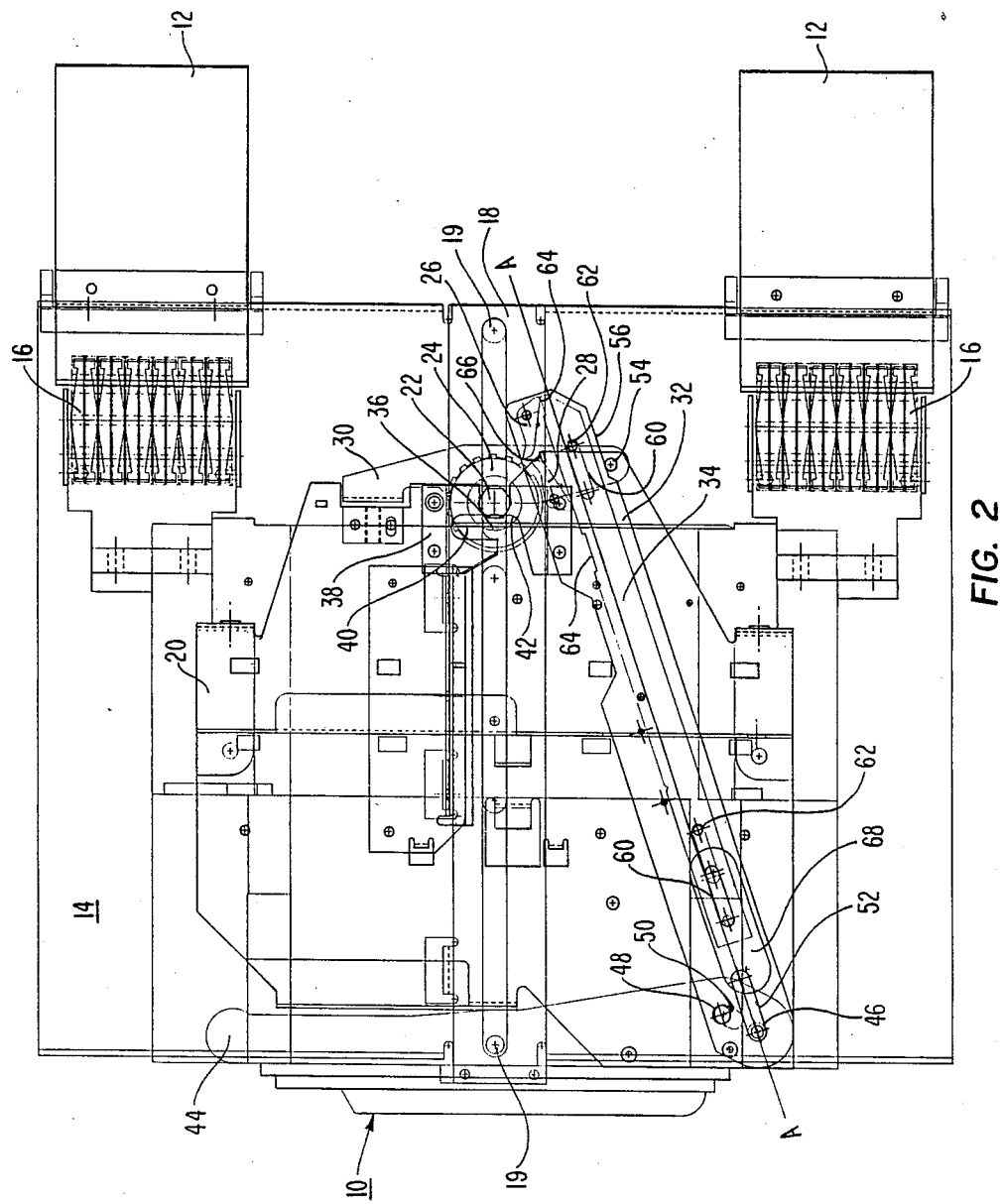
FIG. 2 is a right side view of the circuit breaker movement mechanism supporting a circuit breaker.

FIG. 2 illustrates the circuit breaker 10 fully engaged with the primary terminals 12. The circuit breaker movement mechanism is also illustrated in FIG. 2. The mechanism includes a side frame 20, a shaft 22 rotably mounted to the circuit breaker 10 by a bearing member 30 and frame 20, a ratchet wheel 24 fixed to the shaft 22, an engaging drive pawl 28, a disengaging drive pawl 26, a pawl moving member 32, a member 34 for controlling which pawl engages the ratchet wheel 24, a drive pin 36 and drive pin latch 38. To minimize the space occupied by the members 32, 34, they can be fabricated as a punching from bar stock to have the configurations illustrated in FIGS. 2 and 2A.

To engage the circuit breaker 10 with the primary terminals 12, the circuit breaker 10 is moved via the rail pairs 18 such that the drive pin 36 engages the drive pin latch 38. Since the pin 36 is fixed to the ratchet wheel 24, the pin 36 engages the locking slot 40 of the latch 38 when the ratchet wheel 24 is rotated counter-clockwise. When the pin 36 has engaged the locking slot 40, the circuit breaker 10 is fixed into engagement with the primary terminals 12.

To disengage the circuit breaker 10 from the primary terminals 12 and overcome the associated friction forces, the circuit breaker 10 is moved via the rail pairs 18 when the ratchet wheel 24 is rotated clockwise. When the ratchet wheel 24 is rotated clockwise, the drive pin 36 exerts a force against the rear surface 42 of the drive pin latch 38. The drive pin 36 is fixed upon the ratchet wheel 24 so that the pin 36 has enough movement when the wheel 24 is rotated so that finger assemblies 16 are substantially disengaged from the primary terminals 12. This allows the circuit breaker 10 to be moved from the housing 14 via the rails 18 by hand.

In general, the ratchet wheel 24 is rotated in both directions by pumping the lever 44. When the lever 44 is pumped it pivots about the lever pivot 46 causing a pin 48, fixed to the pawl moving member 32, to slide within a slot 50 in the lever 44 causing the member 32 to translate along line A-A. The member 32 is guided along line A-A through the cooperation of the pivot 46, the slot 52, the pin 54 and the bearing surface 56.

Figure 2A:
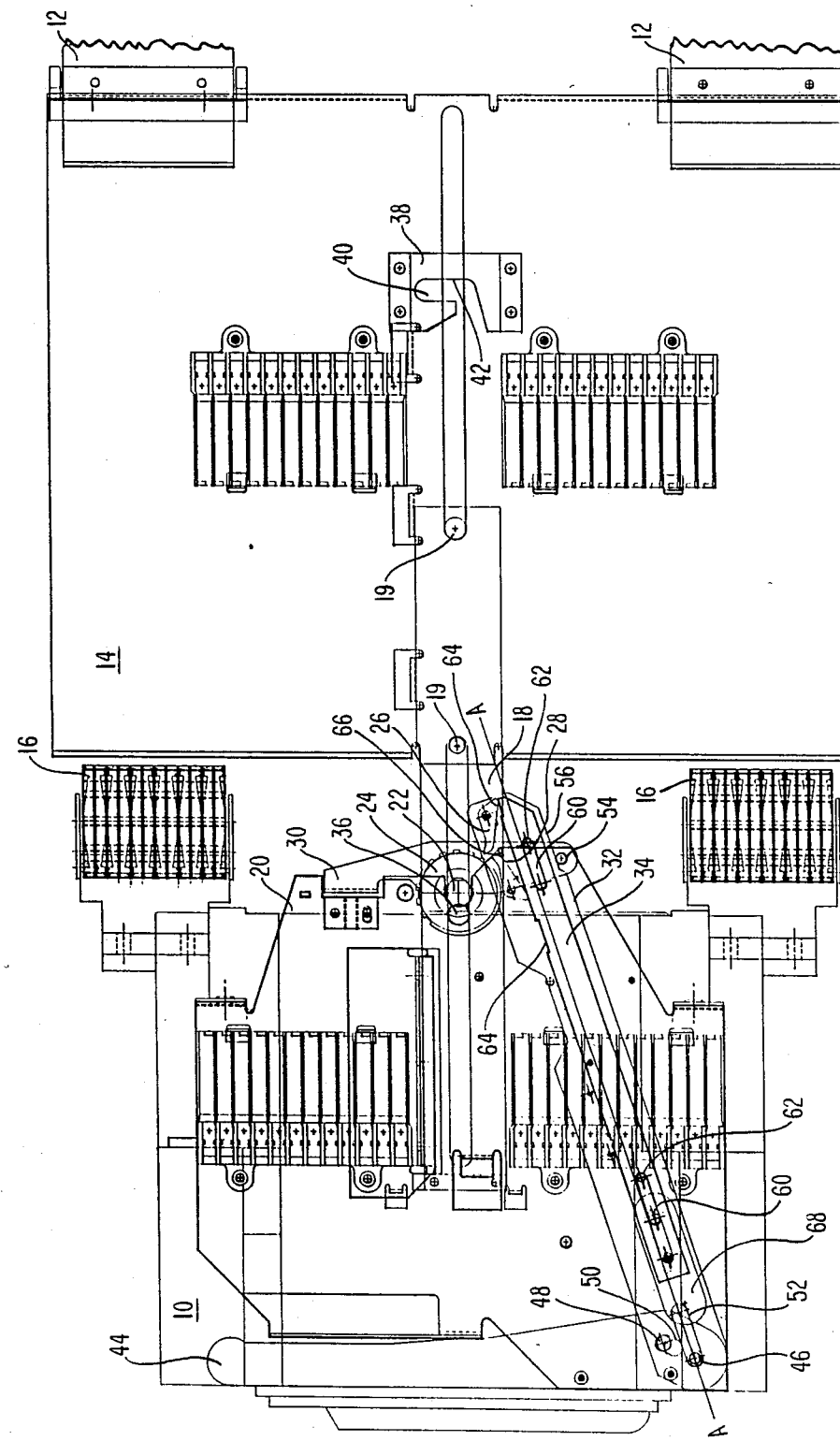
FIG. 2A is a right side view of the circuit breaker movement mechanism supporting a circuit breaker, wherein the circuit breaker is disengaged from the primary terminals.

To rotate the ratchet wheel 24 in the clockwise direction the disengaging drive pawl 26 is caused to engage the wheel 24 while the engaging drive pawl 28 is prevented from engaging the wheel 24 during translation of the pawl moving member 32. To rotate the ratchet wheel 24 in the counter-clockwise direction the engaging drive pawl 28 is caused to engage the wheel 24 while the disengaging drive pawl 26 is prevented from engaging the wheel 24 during translation of the member 32. As illustrated in FIGS. 2 and 2A, the pawls 26, 28 are pivotally attached to the member 32.

The engagement of the pawls 26, 28 with the wheel 24 is controlled by an engagement control member 34 which includes slots 60 for allowing the member 34 to translate along the member 32 along the pins 62 which attaches the member 34 to the member 32. When the member 34 is in its left-most position as illustrated in FIG. 2, the grooves 64 of the member 34 and the spring 66 in the member 32 cooperate to cause the pawl 26 to engage the wheel 24 when the member 32 is moved to the left along line A—A. When the member 34 is in its right-most position, the grooves 64 of the member 34 and the spring 66 in the member 32 cooperate to cause the pawl 28 to engage the wheel 24 when the member 32 is moved to the left along line A—A. A control handle 68 can be used to control the position of the member 34. The member 34 can be positioned such that neither pawl 26, 28 will engage the wheel 24. In this position, inadvertent operation of the mechanism is avoided.

To avoid overdriving the circuit breaker 10, the ratchet wheel 24 is deplete of ratcheting teeth over a portion of its circumference. Accordingly, the pawls 26, 28 cannot engage this portion and the wheel 24 is not rotated to cause movement of the circuit breaker 10.

Figure 3:
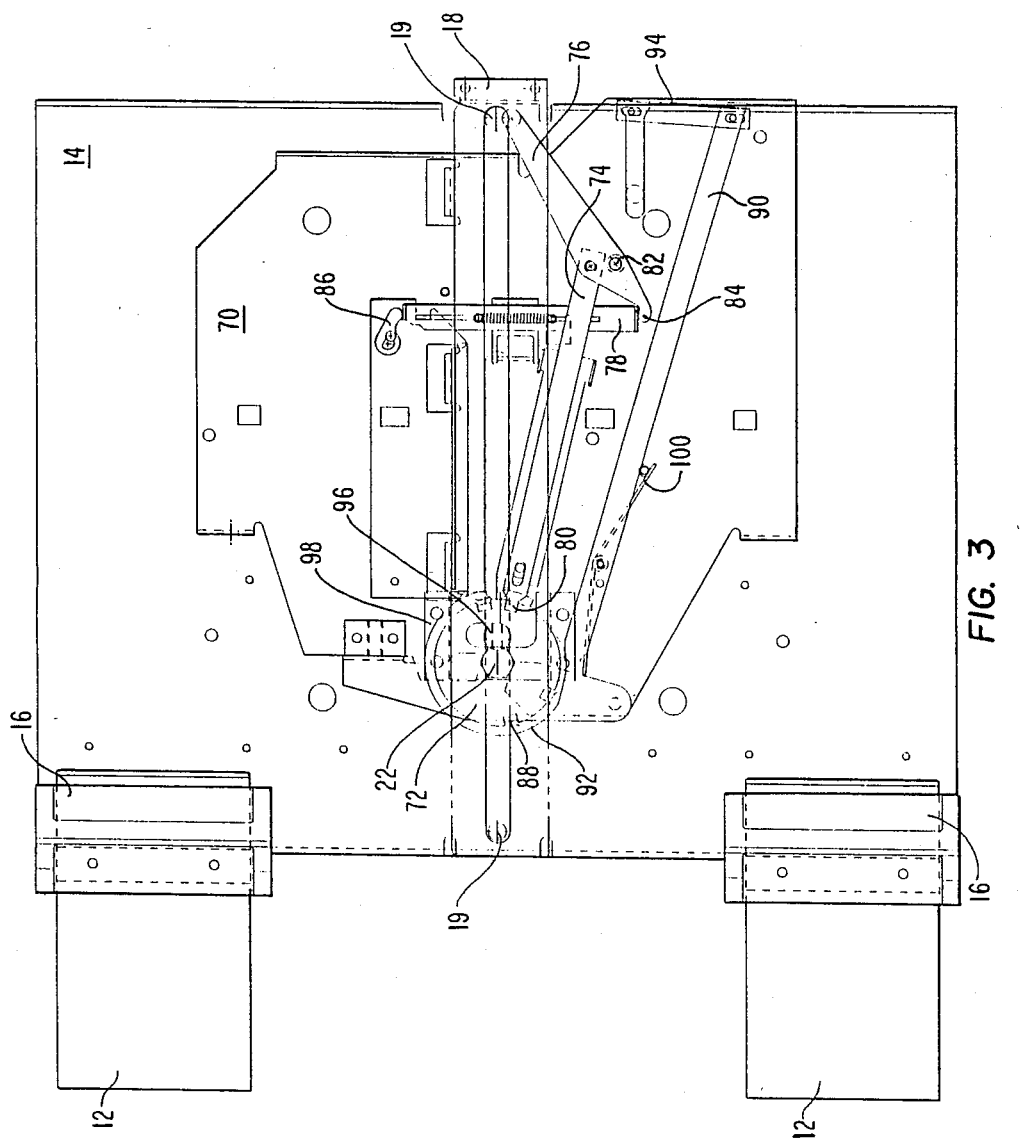
FIG. 3 is a left side view of the circuit breaker movement mechanism supporting a circuit breaker.

As discussed above, it is useful to prevent a circuit breaker from being engaged or disengaged from a bus bar assembly when the circuit breaker is not tripped. In the preferred embodiment of the invention, this is accomplished by preventing rotation of the ratchet wheel 24 by preventing rotation of the shaft 22. To prevent rotation of the shaft 22 when the circuit breaker 10 is not tripped, a locking mechanism is provided as shown in FIG. 3.

The locking mechanism includes a side frame 70, an engagement wheel 72 fixed to the shaft 22, an engagement member 74, a release lever 76 and a translating trip member 78. When the assemblies 16 of the circuit breaker 10 are engaged with the primary terminals 12, the engagement member 74 engages a slot 80 in the periphery of the engagement wheel 72 which prevents the shaft 22 from turning. To disengage the member 74 from the slot 80 the release lever 76 is rotated clockwise about the pivot 82 causing the member 74, which is pivotally mounted to the lever 76, to disengage the slot 80. In addition, while the lever 76 causes the trip member 78 to move upward and activate the tripping lever 86 of the circuit breaker 10 causing the circuit breaker 10 to trip.

The engagement wheel 72 also includes a slot 88 which prevents the shaft 22 from rotating after the circuit breaker 10 has been disengaged from the primary terminals 12. Accordingly, the lever 76 must be rotated clockwise to disengage the engagement member 74 from the wheel 72 before the circuit breaker 10 can be reengaged with the primary terminals 12. This ensures that the circuit breaker 10 is tripped by the trip member 78 before the circuit breaker 10 is reengaged with the primary terminals 12. To provide intermediate positions for the circuit breaker 10, additional slots 73 can be provided and still ensure that the circuit breaker 10 is tripped before it is reengaged with the primary terminals 12.

To ensure uniform engagement of all phases of the circuit breaker 10 the engagement wheel 72 is also provided with a drive pin 96 which engages a second drive pin latch 98 while the drive pin 36 engages the drive pin latch 48 on the other side of the circuit breaker as the shaft is rotated.

The side frame 70 is also provided with a system for indicating whether or not the circuit breaker 10 is engaged with the primary terminals 12. This system includes an indicator rod 90 pivotally mounted to the frame 70, a cam 92 fixed to the shaft 22, and a display plate 94. The rotational angle of the shaft 22 corresponds to the location of the circuit breaker 10 relative to the primary terminals 12 and the cam 92 has a varying diameter which corresponds to the rotational angles of the shaft 22 which correspond to important positions of the circuit breaker 10. Accordingly, the indicator rod 90, which is pivoted against the cam 92 by a spring 100, indicates the circuit breaker 10 position at the display plate 94 as the cam 92 is rotated.

While one embodiment of a circuit breaker movement mechanism has been shown and described in detail herein, various other changes and modifications may be made without departing from the scope of the present invention.

We claim:

1. A mechanism for moving and supporting a circuit breaker relative to a bus bar arrangement such that the circuit breaker can be engaged and disengaged from the bus bar arrangement, the mechanism comprising:
   means for supporting the circuit breaker;
   means for moving the circuit breaker relative to the bus bar arrangement;
   means for restricting operation of the means for moving when the circuit breaker is not tripped; and
   wherein the means for moving the circuit breaker relative to the bus bar arrangement comprises:
      first means for supporting, the first means mounted to the circuit breaker;
      a shaft rotatably mounted to the first means for supporting;
      a drive wheel coupled to the shaft;
      means for engaging the drive wheel;
      means for moving the means for engaging the drive wheel, the means for moving being supported by the first means for supporting; and
      means for controlling the engagement of the means for engaging with the drive wheel such that the shaft is rotatable in a first direction to cause the circuit breaker to be moved toward the bus bar arrangement.

2. The mechanism of claim 1 further comprising a means for indicating if the circuit breaker is engaged with the bus bar arrangement.

3. The mechanism of claim 1, wherein:
   the drive wheel includes a ratchet portion;
   the means for engaging the drive wheel comprises a first pawl and a second pawl, each adapted to engage the ratchet portion; and the means for moving comprises a pawl moving member slidably mounted to the first means for supporting, wherein the pawls are pivotally mounted to the pawl moving member.

4. The mechanism of claim 3 further comprising:
a handle pivotally mounted to the first means for supporting, such that when the handle is pivoted, the pawl moving member is slid;
a first engaging member fixed to the drive wheel; and
a first engagement member fixed to the means for supporting the circuit breaker, the engaging member and the engagement member cooperating such that the circuit breaker is moved relative to the bus bar arrangement.

5. The mechanism of claim 3 wherein means for restricting operation of the means for moving when the circuit breaker is not tripped comprises:
second means for mounting, the second means mounted to the circuit breaker;
an engagement wheel fixed to the shaft; and
means for engaging the engagement wheel operable such that when the means for engaging is engaged with the engagement wheel the shaft is restricted from turning and when the means for engaging is caused to disengage from the engagement wheel the circuit breaker is tripped.

6. The mechanism of claim 5, wherein the means for engaging the engagement wheel comprises:
a member for engaging the engagement wheel, the member for engaging being slidably mounted to the second means for mounting;
a trip member for tripping the circuit breaker, the trip member being slidably mounted to the second means for mounting; and
a control lever pivotally mounted to the second means for mounting, wherein the control lever cooperates with the member for engaging the engagement wheel and the trip member such that the control lever causes the trip member to trip the circuit breaker when the member for engaging the engagement wheel is disengaged from the engagement wheel.

7. The mechanism of claim 6 further comprising:
a second engaging member fixed to the engagement wheel; and
a second engagement member fixed to the means for supporting the circuit breaker, the second engaging member and the second engagement member cooperating such that the circuit breaker is moved relative to the bus bar arrangement.

8. The mechanism of claim 3, wherein the means for supporting comprises a first rail, and a second rail; wherein the rails are fixed to the circuit breaker, and the rails are movably supported by a plurality of roller assemblies; the means for supporting being oriented relative to the bus bar structure such that the rails and roller assemblies cooperate to permit engagement and disengagement of the circuit breaker with the bus bar arrangement.

9. The mechanism of claim 8, wherein the means for supporting includes a plurality of rollers adapted to further decrease the force necessary to move the circuit breaker.

10. The mechanism of claim 5, wherein the means for supporting comprises a first rail, and a second rail; wherein the rails are fixed to the circuit breaker, and the rails are movably supported by a plurality of roller assemblies; the means for supporting being oriented relative to the bus bar structure such that the rails and roller assemblies cooperate to permit engagement and disengagement of the circuit breaker with the bus bar arrangement.

11. The mechanism of claim 10, wherein the means for supporting includes a plurality of rollers adapted to further decrease the force necessary to move the circuit breaker.

12. A mechanism for moving and supporting a circuit breaker relative to a bus bar arrangement such that the circuit breaker can be engaged and disengaged from the bus bar arrangement, the mechanism comprising:
means for supporting the circuit breaker;
first means for supporting, the first means mounted to the circuit breaker;
a shaft rotatably mounted to the first means for supporting;
a ratchet wheel fixed to the shaft;
a first pawl and a second pawl, each adapted to engage the ratchet wheel;
a pawl moving member slidably mounted to the first means for supporting, wherein the pawls are pivotally mounted to the pawl moving member;
means for controlling the engagement of the pawls with the ratchet wheel such that when the first pawl is engaged with the ratchet wheel and the pawl moving member is slid, the shaft is rotated causing the circuit breaker to be moved away from the bus bar arrangement and when the second pawl is engaged with the ratchet wheel and the pawl moving member is slid, the shaft is rotated causing the circuit breaker to be moved toward the bus bar arrangement;
second means for mounting, the second means mounted to the circuit breaker;
an engagement wheel fixed to the shaft; and
means for engaging the engagement wheel operable such that when the means for engaging is engaged with the engagement wheel the shaft is restricted from turning and when the means for engaging is caused to disengage from the engagement wheel the circuit breaker is tripped.

13. The mechanism of claim 12 further comprising:
a handle pivotally mounted to the means for supporting, such that when the handle is pivoted, the pawl moving member is slid;
a first engaging member fixed to the ratchet wheel; and
a first engagement member fixed to the means for supporting the circuit breaker, the engaging member and the engagement member cooperating such that the circuit breaker is moved relative to the bus bar arrangement.

14. The mechanism of claim 13, wherein the means for engaging comprises:
a member for engaging the engagement wheel, the member for engaging being slidably mounted to the second means for mounting;
a trip member for tripping the circuit breaker, the trip member being slidably mounted to the second means for mounting;
a control lever pivotally mounted to the second means for mounting, wherein the control lever cooperates with the member for engaging and the trip member such that the control lever causes the trip member to trip the circuit breaker when the member for engaging is disengaged from the engagement wheel;

a second engaging member fixed to the engagement wheel; and a second engagement member fixed to the means for supporting the circuit breaker, the second engaging member and the second engagement member cooperating such that the circuit breaker is moved relative to the bus bar arrangement.

15. The mechanism of claim 14, wherein the means for supporting comprises a first rail, and a second rail; wherein the rails are fixed to the circuit breaker, and the rails are movably supported by a plurality of roller assemblies; the means for supporting being oriented relative to the bus bar structure such that the rails and roller assemblies cooperate to permit engagement and disengagement of the circuit breaker with the bus bar arrangement.

16. The mechanism of claim 15, wherein the means for supporting includes a plurality of rollers adapted to further decrease the force necessary to move the circuit breaker.

17. The mechanism of claim 16 further comprising a means for indicating if the circuit breaker is engaged with the bus bar arrangement.

* * * * *